UNITED STATES PATENT OFFICE.

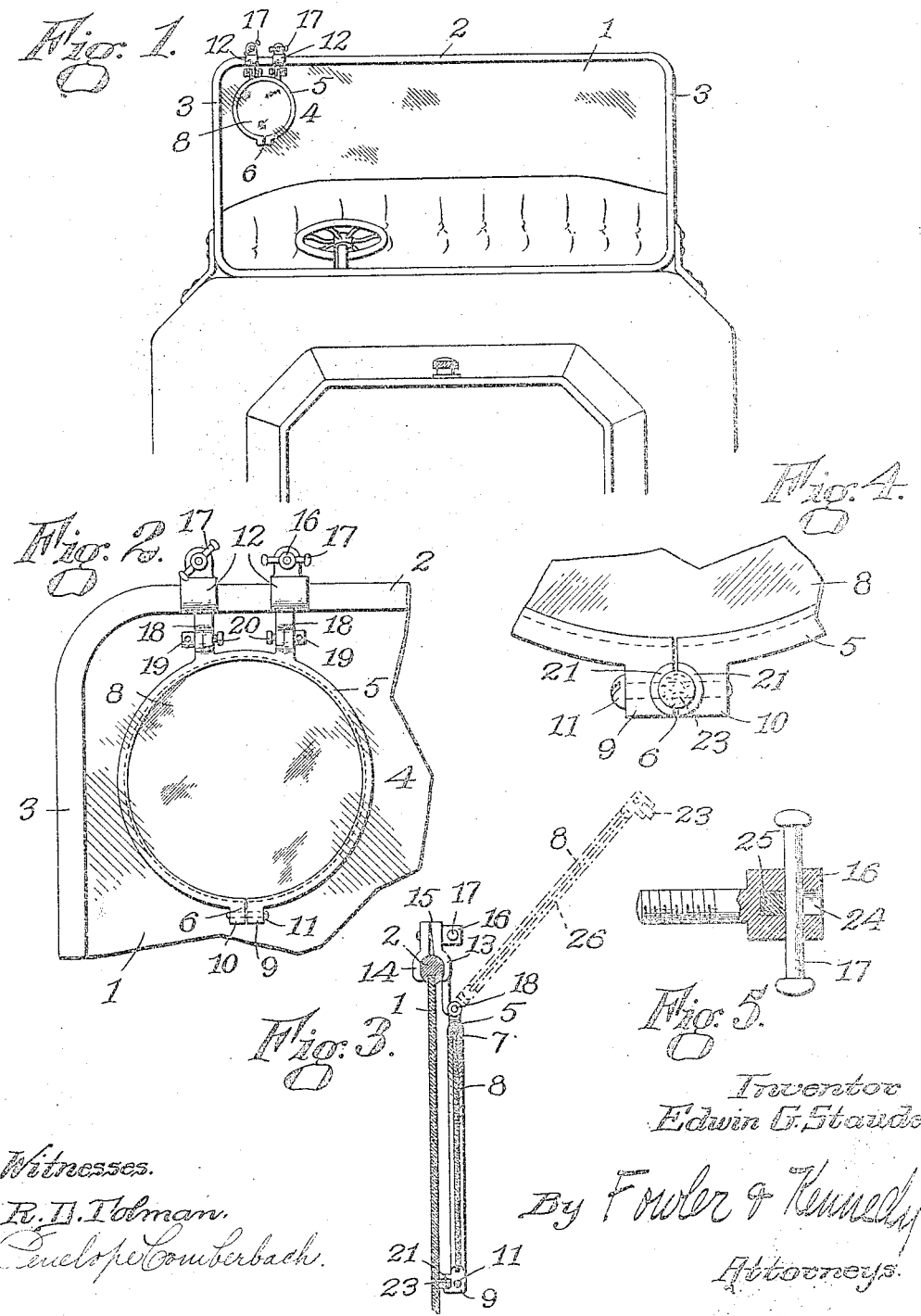

EDWIN G. STAUDE, OF MINNEAPOLIS, MINNESOTA, ASSIGNOR TO E. G. STAUDE MANUFACTURING COMPANY, OF ST. PAUL, MINNESOTA, A CORPORATION.

LIGHT-SCREEN FOR AUTOMOBILES.

1,259,155.      Specification of Letters Patent.      Patented Mar. 12, 1918.

Application filed August 26, 1914. Serial No. 858,735.

*To all whom it may concern:*

Be it known that I, EDWIN G. STAUDE, a citizen of the United States, residing at Minneapolis, in the county of Hennepin and State of Minnesota, have invented a new and useful Improvement in Light-Screens for Automobiles, of which the following is a specification accompanied by drawings forming a part of the same.

My present invention relates to a light screen for automobiles, interposed between the chauffeur and the headlights of approaching automobiles, by which the blinding glare of the headlights may be modified or reduced. Interposed screens of colored glass are now used for the purpose and the objects of my present improvement are to provide a screen of the character described which is simple in construction, easily applied and adjusted and capable of being securely held free from the vibration incident to the rapid movement of the automobile. These objects I secure by the construction and arrangement of parts as hereinafter described, the novel features being pointed out in the annexed claims.

In the accompanying drawings,

Figure 1 represents a front view of a portion of an automobile, showing the windshield with one of my improved light screens mounted thereon.

Fig. 2 is an enlarged view of a portion of the windshield with my improved light screen attached to the top rail of the windshield.

Fig. 3 is a central sectional view of my improved light screen on the plane of the broken line 3—3, Fig. 2.

Fig. 4 is an enlarged view of a portion of the rim of the light screen, showing the side next the windshield, and Fig. 5 shows a central sectional view of one of the clamping bolts.

Similar reference characters refer to similar parts in the different figures.

Referring to the drawings, 1 denotes the windshield of an automobile which may be of any known form of construction, in the present instance comprising two sheets of plate glass inclosed in a suitable framework, of which 2 denotes the upper rail and 3, 3 the side rails of the upper half of the windshield. The light screen, embodying my present improvement, is represented at 4 and it consists of a circular rim 5 divided on one side at 6 and having an interior shallow groove 7 for the insertion of a circular disk 8 of any suitable material, such as colored glass, for reducing the intensity of light passing therethrough. The free ends of the rim 5 are provided with lugs 9 and 10 having alined holes, that in the lug 9 being plain and that in the lug 10 being screw-threaded to receive a tightening screw 11, by which the lugs are drawn together, thereby clamping the disk 8 with the rim 5.

On the side of the rim 5 opposite the lugs 9 and 10 are clamps 12 adapted to tightly embrace the framework of the windshield and, as represented in Figs. 1 and 2, attached to the top rail 2 of the windshield. The clamps 12 consist of two clamping members 13 and 14 which contact at their upper edges 15 and are drawn together against the rail 2 of the windshield by means of a clamping bolt 16 which, for convenience of adjustment, is provided with a lever 17 passing transversely through the head of the bolt 16. The clamping members 13 are connected with the rim 5 by hinged joints 18 capable of being clamped together or tightened by clamping screws 19, 19, which are screw threaded into one member of the hinged joint. The ends of the screws 19 are provided with nuts 20 securely attached to the ends of the screws to prevent the latter from being accidentally withdrawn.

The lugs 9 and 10 are provided on the side next the windshield with semi-cylindrical projections 21—21 which inclose a circular socket when the lugs are brought together for the reception of an elastic block of rubber 23, which is crowded against the windshield 1 and slightly compressed when the screen is clamped in position for the purpose of checking the vibration incident to the jar of the machine. The clamps 12 are spaced apart to form with the elastic block 23 a three-point attachment of the screen to the windshield, thereby securing a uniform pressure upon the yielding block 23. The heads of the bolts 16 are provided with longitudinal holes 24, in the bottom of which are inserted yielding rubber blocks 25 which are slightly compressed as the levers 17 are inserted for the purpose of exerting sufficient pressure against the levers 17 to prevent their rattling while, at the same time, the levers are capable of being moved lengthwise in order to secure sufficient leverage to securely bind the clamping members 13 and 14 against the framework of the windshield.

The screen 4 is placed in suitable position to enable the chauffeur, by a slight movement of his head to one side, to interpose the screen between his eyes and the headlight of an approaching automobile. When the occasion for using the screen has passed, the chauffeur, occupying his usual position, looks through the plain portion of the windshield. In order to remove the screen from the line of vision without detaching it from the framework of the windshield, or for the purpose of cleaning the opposing surfaces of the screen and windshield, the former may be swung on its hinged joints 18 into the position indicated by broken lines 26, Fig. 3, and the hinged joints tightened to hold the screen in its raised position.

When the screen is lowered the hinged joints 18 are again tightened. The tightening of the clamps 12 serves to bind the yielding block 23 against the glass of the windshield and the elasticity of the block 23 further serves, when compressed by the lugs 21, to exert a pressure against the screw 11 and prevent its becoming loosened by the jar of the machine.

I claim:

1. A light screen for automobiles comprising a rim divided on one side, a colored medium for the transmission of light held by said rim, means for detachably attaching the rim to a supporting framework, means for uniting the ends of the divided rim, a pair of opposing projections carried by the ends of the rim, and a yielding member clamped therein by the rim uniting means.

2. The combination with a framework and a windshield supported thereby, of a rim provided with a pair of spaced clamping members adjustably attached to one side of said framework, a yielding block carried between the free ends of said rim and bearing against the windshield, and a colored medium carried by said rim.

Dated this 21st day of August, 1914.

EDWIN G. STAUDE.

Witnesses:
D. W. HEITMAN,
T. HENSON.